൧

3,202,666
SUBSTITUTED 9H-PYRIDO(3-4-b)INDOLE-1 CAR-
BOXYLIC ACID AND DERIVATIVES
Jacob Szmuszkovicz, Kalamazoo, Mich., assignor to The
Upjohn Company, Kalamazoo, Mich., a corporation of
Delaware
No Drawing. Filed Nov. 6, 1963, Ser. No. 321,662
2 Claims. (Cl. 260—295)

This invention relates to novel indole derivatives and acid addition salts thereof.

The compounds of this invention include substituted 6-methoxy-9H-pyrido[3,4-b]indoles of the formula

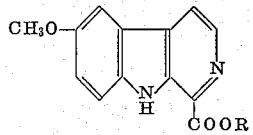

wherein R is hydrogen or a lower alkyl group of 1–4 carbon atoms (e.g., methyl, ethyl, isopropyl, butyl, and the like), and the physiologically acceptable acid addition salts thereof, such as the hydrochloride, hydrobromide, acetate, pyruvate, sulfate, phosphate, citrate, tartrate, salicylate, lactate, succinate, benzoate, nitrate, p-toluenesulfonate and the like.

The products and intermediate of this invention are named in accord with the basic structure having positions numbered as follows

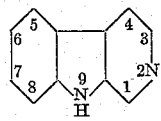

The compounds of this invention demonstrate significant sedative and antiparasitic activity and can be administered to humans and animals as the primary active ingredients of conventional pharmaceutical forms such as tablets, capsules, elixirs, injectable solutions and suspensions and the like. Additionally, the free bases form salts with fluosilicic acid which are useful as mothproofing agents in accord with U.S. Patents 1,915,334 and 2,075,359. The free bases also form salts with thiocyanic acid which condense with formaldehyde to form resinous materials useful as pickling inhibitors according to U.S. Patents 2,425,320 and 2,606,155.

In preparing the products of this invention the known 1 - methyl - 6-methoxy-9H-pyridol[3,4-b]indole is reacted with benzaldehyde to yield 1 - styryl - 6 - methoxy-9H-pyridol[3,4-b]indole. Oxidation of this product gives the desired 6-methoxy-9H-pyrido[3,4-b]indole-1-carboxylic acid, which is purified by conventional procedures. Esters of this acid are prepared in the usual manner, e.g., by reacting the acid product with the appropriate alcohol to introduce the desired alkyl groups into the structure. Conventional treatment of either the acid product or its esters with the appropriate acid, such as hydrochloric, hydrobromic, acetic and the like, produces the corresponding acid addition salt as alluded to above.

The following preparation and examples illustrate the synthesis of representative products of this invention but are not to be construed as limiting the scope thereof.

PREPARATION 1

*1-styryl-6-methoxy-9H-pyrido[3,4-b]indole*

A solution of 1-methyl-6-methoxy-9H-pyridol[3,4-b]indole (14.6 gm., 0.069 mole) in 69 ml. of benzaldehyde was refluxed under nitrogen for 4 hours with an azeotropic separator. It was then cooled to room temperature, 500 ml. of ether was added followed by 10% aqueous hydrochloric acid until precipitation of the hydrochloride was complete. The solid was filtered, washed with ether and suspended in 190 ml. of 95% ethanol. Dilute ammonium hydroxide (125 ml. of 6%) was added and the resulting free base was filtered and washed with water. Crystallization from methanol afforded 17.8 gm. (86% yield) of product as yellow prisms melting at 167–169° C., unchanged on recrystallization. Ultraviolet spectrum (ethanol) showed λmax. 220 (31,800); 250 (24,650); sh 262 (18,950); 323 (26,350); 298 (11,050). Infrared spectrum (mineral oil mull) showed NH: 3610, 3240, 3160; =CH: 3060, 3020; C=C/C=N: 1643, 1635, 1601, 1580, 1565, 1495.

*Analysis.*—Calcd. for $C_{20}H_{26}N_2O \cdot \frac{1}{4}CH_3OH$: C, 78.87; H, 5.56; N, 9.09. Found: C, 78.79; H, 5.42; N, 9.13.

EXAMPLE 1

*6-methoxy-9H-pyrido[3,4-b]indole-1-carboxylic acid*

An aqueous saturated solution of potassium permanganate (232 ml.) was added during 15 minutes to an ice-cooled solution of the benzylidene compound, 1-styryl-6-methoxy - 9H - pyrido[3,4 - b]indole (10.7 gm., 0.0357 mole), in 178 ml. of pyridine. Stirring was continued for 2 hours. Ethanol (18 ml.) was then added and the mixture was heated on the steam bath for 5 minutes, filtered hot and concentrated to about half the volume in vacuo on the steam bath. It was then cooled and acidified with dilute hydrochloric acid. The resulting precipitate was filtered and dissolved in hot aqueous 5% potassium hydroxide. The solution was cooled, acidified with acetic acid and the resulting solid was filtered and washed with water to give 2.5 gm. (29% yield) of desired product, M.P. 244° C. (dec.), unchanged on recrystallization from water (yellow rods). Ultraviolet spectrum (ethanol) showed sh 229 (17,600); sh 236 (16,800); λmax. 272 (18,900); 311 (14,300); 321 (13,700); 412 (2,800). Infrared spectrum (mineral oil mull) showed NH: 3200; bonded OH: 2660; C=O: 1650; C=C/C=N: 1595, 1575, 1530, 1500.

*Analysis.*—Calcd. for $C_{13}H_{10}N_2O_3$: C, 64.46; H, 4.16; N, 11.57; $OCH_3$, 12.81. Found: C, 65.03; H, 4.23; N, 11.42; $OCH_3$, 12.87.

EXAMPLE 2

*Esters of 6-methoxy-9H-pyrido[3,4-b]indole-1-carboxylic acid*

Reaction of 6-methoxy-9H-pyrido[3,4-b]indole-1-carboxylic acid with, for example, methanol, or other alkanols containing four carbon atoms or less, yields the methyl ester or other corresponding esters which can be purified in the usual manner.

EXAMPLE 3

*Salts*

Acid addition salts of the acid product of Example 1 and the esters of Example 2 are prepared conventionally by treating the indole acid or ester with the desired acid, such as hydrochloric, hydrobromic, acetic, pyruvic, sulfuric, phosphoric, citric, tartaric, salicylic, lactic, succinic, benzoic, nitric, p-toluenesulfonic and the like, followed by customary purification.

What is claimed is:
1. A compound selected from the group consisting of (1) substituted 6-methoxy-9H-pyrido[3,4-b]indoles of the formula

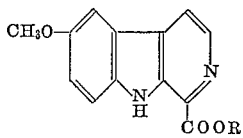

wherein R is a member selected from the group consisting of hydrogen and a lower alkyl group of 1–4 carbon atoms, and (2) physiologically acceptable acid addition salts thereof.

2. 6-methoxy-9H-pyrido[3,4-b]indole-1-carboxylic acid.

No references cited.

WALTER A. MODANCE, *Primary Examiner.*